(12) United States Patent
Cho et al.

(10) Patent No.: US 8,289,131 B2
(45) Date of Patent: Oct. 16, 2012

(54) SECURITY METHOD AND SYSTEM USING TOUCH SCREEN

(75) Inventors: Eun-sung Cho, Suwon-si (KR); Soo-Jin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 854 days.

(21) Appl. No.: 12/181,474

(22) Filed: Jul. 29, 2008

(65) Prior Publication Data

US 2009/0034804 A1 Feb. 5, 2009

(30) Foreign Application Priority Data

Aug. 2, 2007 (KR) .................. 10-2007-0077811

(51) Int. Cl.
*G05B 23/00* (2006.01)
*G05B 19/00* (2006.01)
*G06K 9/00* (2006.01)
*G06F 3/041* (2006.01)
*G06F 3/033* (2006.01)

(52) U.S. Cl. ....... 340/5.51; 340/5.54; 340/5.8; 382/115; 345/173; 345/179

(58) Field of Classification Search .................. None
See application file for complete search history.

(56) References Cited

U.S. PATENT DOCUMENTS

| | | | | |
|---|---|---|---|---|
| 6,029,214 A * | 2/2000 | Dorfman et al. | ................ | 710/73 |
| 6,340,979 B1 * | 1/2002 | Beaton et al. | ................. | 715/764 |
| 7,337,469 B2 * | 2/2008 | Osada et al. | .................... | 726/19 |
| 7,552,467 B2 * | 6/2009 | Lindsay | ............................ | 726/5 |
| 2003/0212709 A1 * | 11/2003 | De Schrijver | .............. | 707/104.1 |
| 2004/0252867 A1 * | 12/2004 | Lan et al. | ....................... | 382/124 |
| 2006/0109252 A1 * | 5/2006 | Kolmykov-Zotov et al. | . | 345/173 |
| 2006/0215886 A1 | 9/2006 | Black | | |
| 2007/0038715 A1 * | 2/2007 | Collins et al. | ................ | 709/206 |
| 2007/0236330 A1 * | 10/2007 | Cho et al. | ..................... | 340/5.54 |
| 2007/0242056 A1 * | 10/2007 | Engelhardt et al. | ........... | 345/173 |
| 2008/0209213 A1 * | 8/2008 | Astrand et al. | ................ | 713/168 |
| 2009/0019188 A1 * | 1/2009 | Mattice et al. | ................... | 710/17 |

FOREIGN PATENT DOCUMENTS

| | | |
|---|---|---|
| JP | 09-146688 | 6/1997 |
| JP | 10-124239 | 5/1998 |
| JP | 2002-207525 | 7/2002 |
| KR | 20060107261 | 10/2006 |
| KR | 20070053458 | 5/2007 |

OTHER PUBLICATIONS

Notice of Allowance issued Jan. 18, 2010 in KR Application No. 2007-0077811.
Korean Office Action issued Sep. 28, 2009 in KR Application No. 2007-0077811.

* cited by examiner

*Primary Examiner* — George Bugg
*Assistant Examiner* — Renee Dorsey
(74) *Attorney, Agent, or Firm* — Stanzione & Kim, LLP

(57) ABSTRACT

A security method and system using a touch screen that allows manipulation input using only an input tool which is not part of a user's body, i.e., finger manipulation, when a secure function such as secure printing is set instead of a normal function when the touch screen is manipulated, so as to prevent leakage of secure information due to fingerprint marks and smudges caused by finger manipulation. The security method includes checking whether or not a password is input, and inputting to the touch screen a password using an input tool which is not part of a user body.

28 Claims, 7 Drawing Sheets

SECURITY METHOD AND SYSTEM USING TOUCH SCREEN

CROSS-REFERENCE TO RELATED APPLICATIONS

This application claims priority under 35 U.S.C. §119(a) from Korean Patent Application No. 10-2007-0077811, filed on Aug. 2, 2007, in the Korean Intellectual Property Office, the disclosure of which is incorporated herein in its entirety by reference.

BACKGROUND OF THE INVENTION

1. Field of the Invention

The present general inventive concept relates to a security method and system using a touch screen of an apparatus, such as a multifunction apparatus (or an image forming apparatus or a printer), and more particularly, to a security method and system using a touch screen that allows a manipulation input using an input tool in a secure function, such as secure printing, and/or that allows an input by a user body or finger manipulation in a normal function, so as to prevent leakage of secure information due to fingerprint marks and smudges caused by the finger manipulation.

2. Description of the Related Art

Conventional large-sized multifunction apparatuses (or image forming apparatuses or printers), which are commonly used as office machines, employ a graphic liquid crystal display (LCD). The graphic LCD employed by the multifunction apparatuses can provide a touch screen function. The touch screen function provided in the multifunction apparatuses employing the graphic LCD can provide a convenience whereby a user can press a graphic screen with a user hand to perform a required manipulation.

However, when the touch screen function of the multifunction apparatus is used, the user generally uses a finger to input a password for a secure document, so that fingerprints 15 corresponding to the password remain on a surface of a touch screen 10 as illustrated in FIG. 1. This causes security problems. For example, in order to set secure printing, the user uses a finger to touch the touch screen 10 to input the password. After inputting the password, fingerprint marks and manipulation traces remain on the touch screen 10, and this may result in exposure of numerals used in the password.

Japanese Patent Application No. 2002-207525 discloses a technology in which a touch panel can be manipulated when a finger is placed on a fingerprint recognition apparatus. Japanese Patent Application No. 1998-124239 discloses a touch screen distinguishing between an input by a finger and an input by a pen. However, in the technology disclosed in Japanese Patent Application No. 2002-207525, since the inputting operation can be performed only leaving a fingerprint on the fingerprint recognition apparatus, there is a problem in that the fingerprint remains. In addition, the apparatus for distinguishing between the inputs by the finger and the pen disclosed in Japanese Patent Application No. 1998-124239 does not provide a countermeasure against finger input when the password is input.

SUMMARY OF THE INVENTION

The present general inventive concept provides a security method using a touch screen that allows a manipulation input using an input tool when a secure function such as secure printing is set, and/or that allows a manipulation input using a user body, such as a user finger, in a normal function when the touch screen is manipulated, so as to prevent leakage of secure information due to fingerprint marks and smudges caused by finger manipulation.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a security method using a touch screen of an apparatus, the method including checking whether or not a password is input, and inputting to the touch screen a password using an input tool which is not part of a user body. The apparatus may include a multifunction apparatus, a printer, a digital copier, and the like, having a touch screen.

The foregoing and/or other aspects and utilities of the present general inventive concept may also be achieved by providing a security system using a touch screen that allows manipulation input using only an input tool which is not part of a user's body, i.e., finger manipulation, when a secure function, such as secure printing is set instead of a normal function when the touch screen is manipulated, so as to prevent leakage of secure information due to fingerprint marks and smudges caused by finger manipulation.

A password may be input when logging in and logging out during the manipulation input using the input tool.

The security method may further include generating a warning signal when a body portion, such as a finger, is used to input the password to the touch screen.

The foregoing and/or other aspects and utilities of the present general inventive concept may also be achieved by providing a security system using a touch screen of an apparatus, the system including a secure function touch panel unit to receive only an input by an input tool which is not an input by a body contact in a secure function to perform a security job of the apparatus, and a secure function touch panel processor to control the secure function touch panel unit and to check whether or not information input to the secure function touch panel unit is input by the input tool.

The security system may further include a normal function touch panel unit to receive an input by the body contact of a body portion including a finger to perform a normal job; and a normal function touch panel processor to control the normal function touch panel unit.

The input tool may provide the input to the secure function touch panel processor and may include a fingerprint recognition unit to recognize a fingerprint of a user.

The security system may further include a fingerprint registration unit to register a fingerprint of a user in advance in order to check whether or not the fingerprint recognized by the fingerprint recognition unit of the input tool is a fingerprint of an authenticated user, and a fingerprint database to store the fingerprint registered by the fingerprint registration unit.

When a body portion, such as a finger instead of the input tool, contacts the secure function touch panel unit, the secure function touch panel processor may flow a predetermined current to the secure function touch panel unit so that the body portion absorbs the current and the body contact is checked.

The foregoing and/or other aspects and utilities of the present general inventive concept may also be achieved by providing a security system including an image forming apparatus having an input unit to receive through a touch screen a password using an input tool which is not part of a user's body, in a secure function mode to perform a security job, and a controller to check whether the input password is correct.

The image forming apparatus may further include an image forming unit to form an image according to the checking of the input password in a secure function mode.

The foregoing and/or other aspects and utilities of the present general inventive concept may also be achieved by providing a security system including a secure function unit to receive a signal through a first touch panel from a non-conductive unit in a secure function to perform a security job, and a normal function unit to receive a signal through a second touch pane from a conductive unit in a normal function to perform a non-security job.

The secure function unit and the normal function unit may be included in an image forming apparatus, and the security job and the non-security job may be one of a printing operation, a scanning operation, a facsimile operation, and an emailing operation.

The non-conductive unit may include a unit to receive a fingerprint, and the secure function unit determines whether the fingerprint is identical to a reference fingerprint, so that the secure function is set to perform the security job.

The non-conductive unit may be a unit not to leave a remnant on the touch panel, and the conductive unit may be a unit to leave a remnant on the touch panel.

The conductive unit may be a portion of a user body.

The foregoing and/or other aspects and utilities of the present general inventive concept may also be achieved by providing a method of a security system, the method including receiving a signal through a first touch panel from a non-conductive unit in a secure function to perform a security job, and receiving a signal through a second touch pane from a conductive unit in a normal function to perform a non-security.

The foregoing and/or other aspects and utilities of the present general inventive concept may also be achieved by providing a touch screen of an apparatus, including a secure function touch panel unit to receive only an input by an input tool which is not part of a user's body when a secure function such as a security job is performed, and a secure function touch panel processor to control the secure function touch panel unit and to check whether or not information input to the secure function touch panel unit is input by the input tool.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
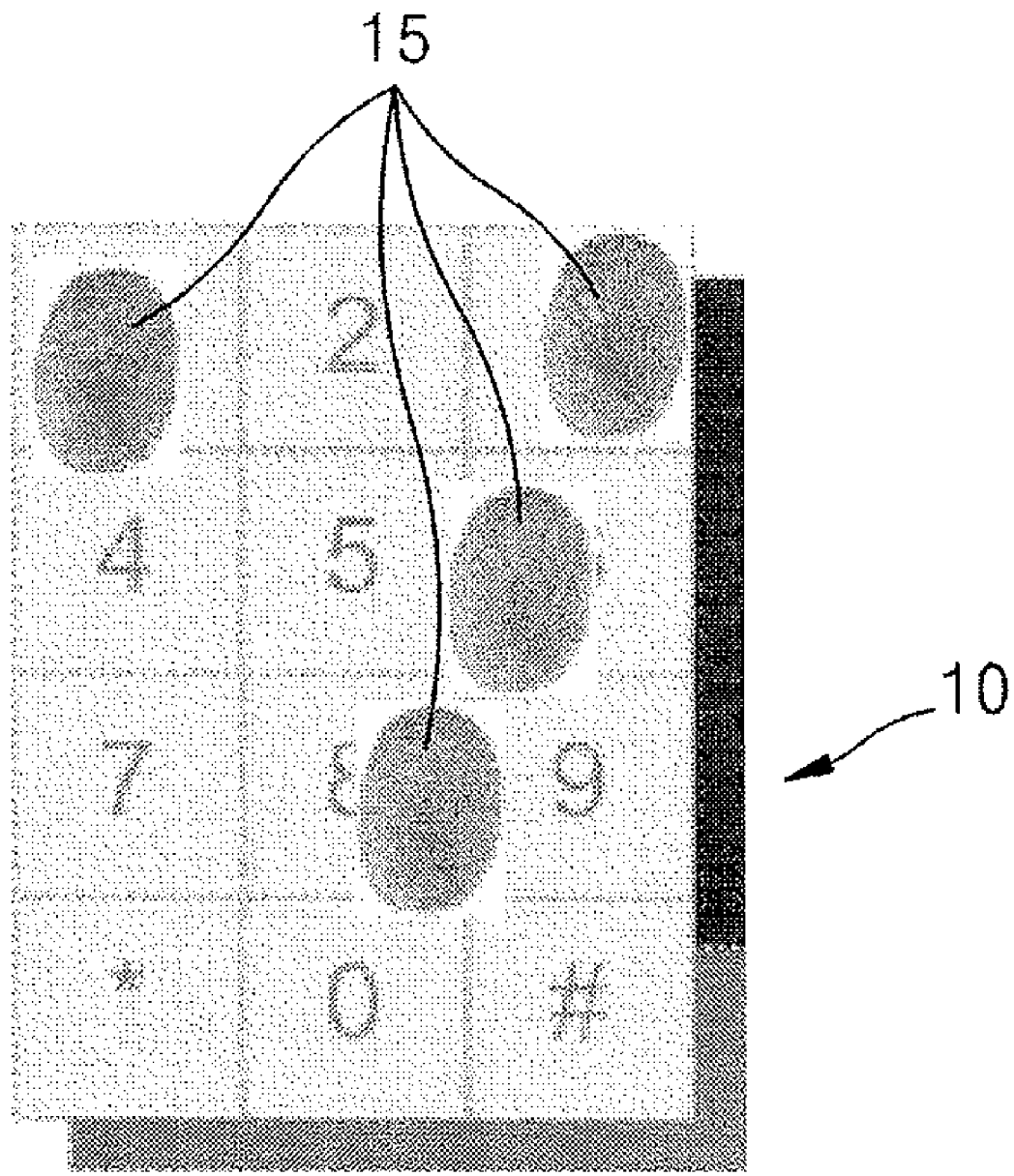
FIG. 1 is a view illustrating a touch screen on which fingerprint marks and manipulation traces remain when a password is input with a finger during a conventional security job operation.

Hereinafter, exemplary embodiments of a security method and system using a touch screen according to the present general inventive concept will be described in detail with reference to the attached drawings. In the description, the detailed descriptions of well-known technologies and structures may be omitted so as not to hinder the understanding of the present general inventive concept. In addition, terms described later are terms defined in consideration of functions according to the present general inventive concept and may be changed according to an intention of a user or an operator or a usage. Therefore, definitions of the terms should be construed based on the description through the specification.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
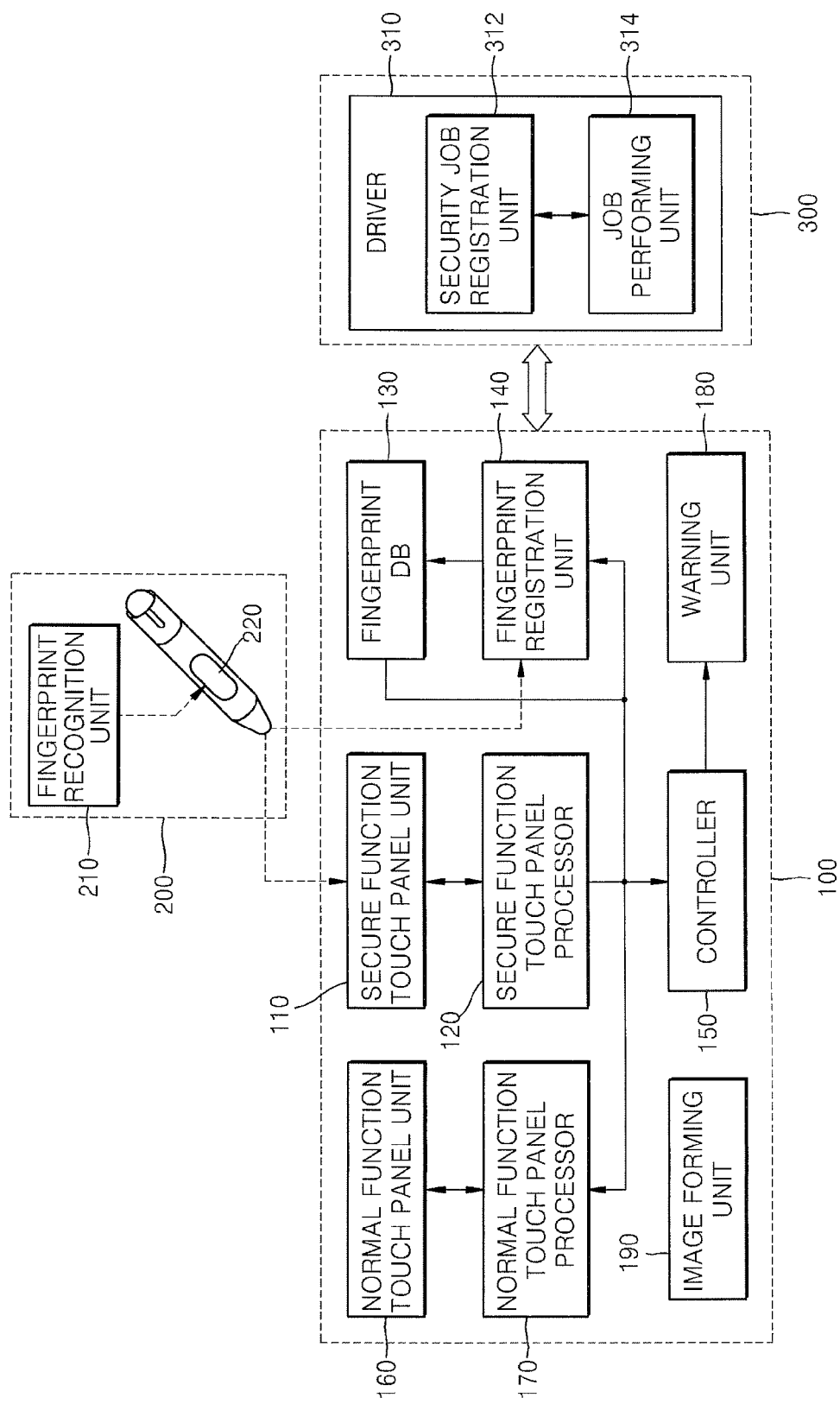
FIG. 2 is a structural view illustrating a security system using a touch screen according to an embodiment of the present general inventive concept.
Figure 3:
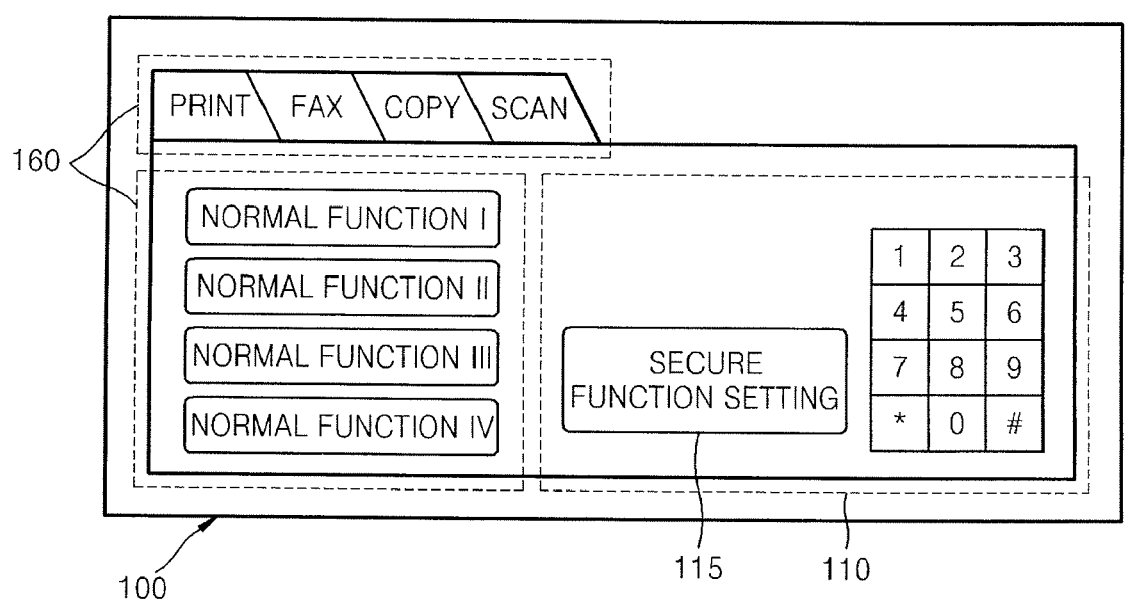
FIG. 3 is a structural view illustrating a manipulation panel of a multifunction apparatus including a touch screen according to an embodiment of the present general inventive concept.
Figure 4:
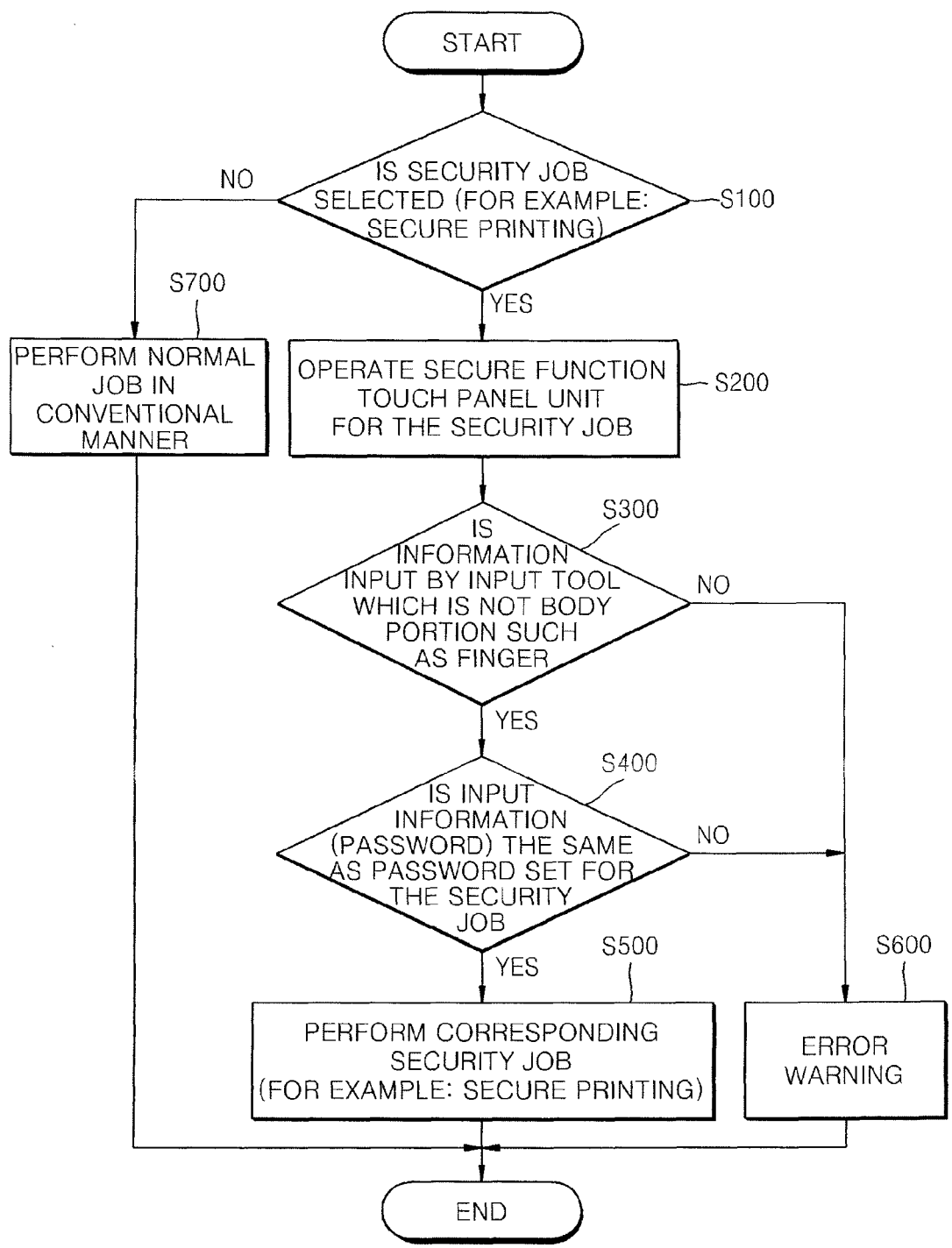
FIG. 4 is a flowchart illustrating a security method using a touch screen according to an embodiment of the present general inventive concept.
Figure 5:
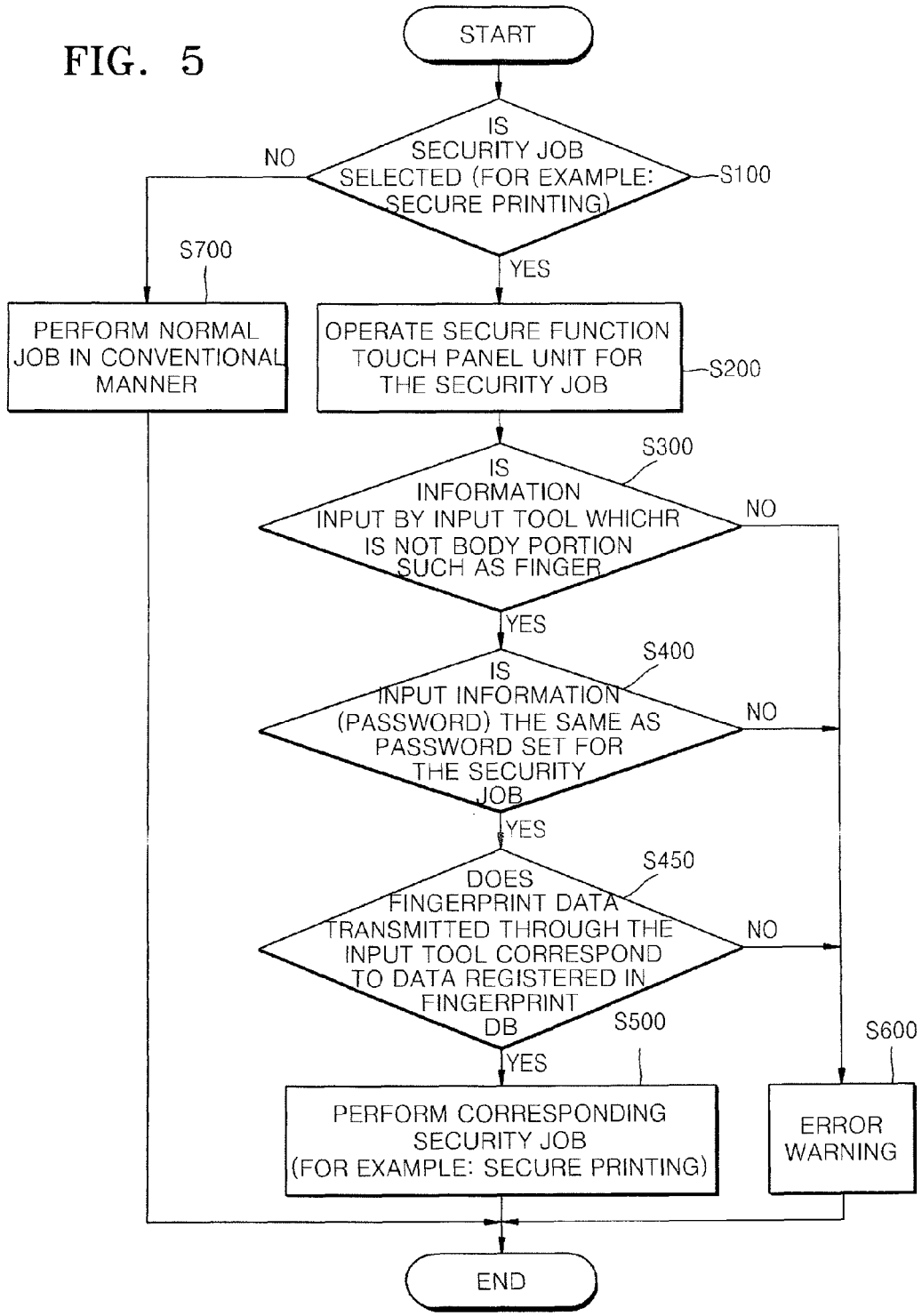
FIG. 5 is a flowchart illustrating a security method using a touch screen according to another embodiment of the present general inventive concept.
Figure 6:
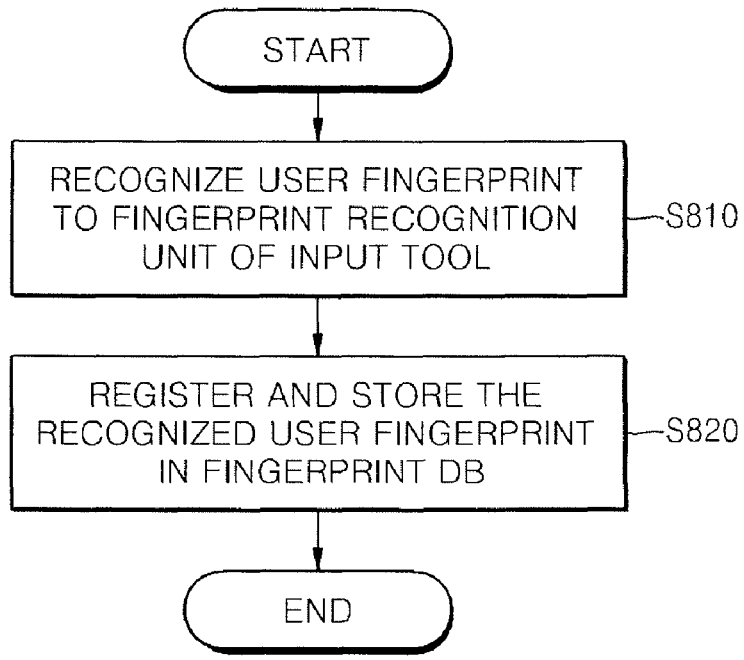
FIG. 6 is a flowchart illustrating operations of recognizing and registering a fingerprint by an input tool applied according to an embodiment of the present general inventive concept.
Figure 7:
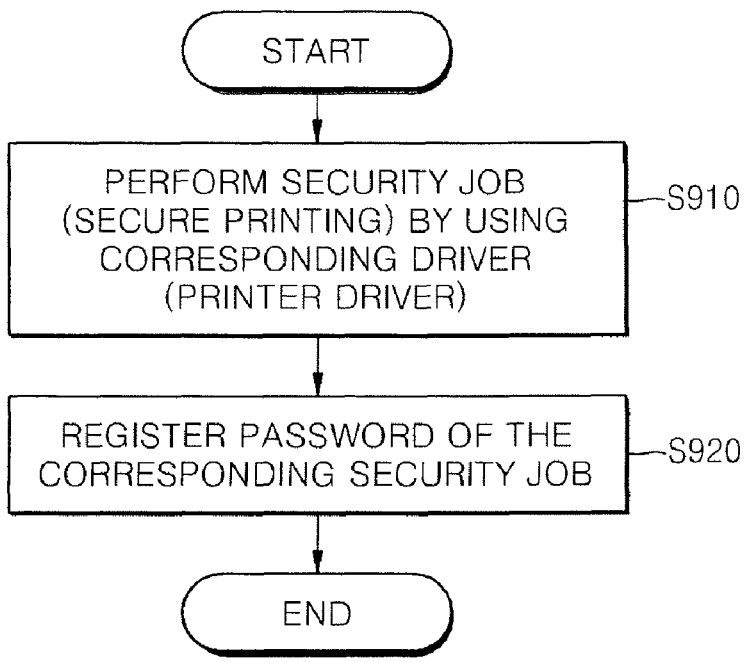
FIG. 7 is a flowchart illustrating operations of performing a corresponding security job by an operation driver and registering a password according to an embodiment of the present general inventive concept.
Figure 8:
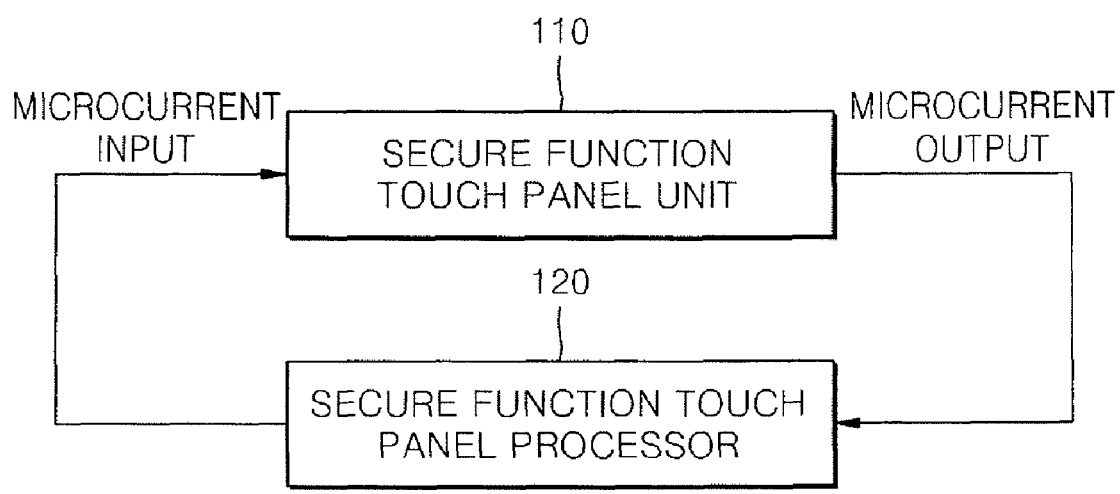
FIG. 8 is a conceptual view illustrating operations of a secure function touch panel unit according to an embodiment of the present general inventive concept.

FIG. 2 is a structural view illustrating a security system using a touch screen according to an embodiment of the present general inventive concept. FIG. 3 is a structural view illustrating a manipulation panel of an apparatus including a touch screen according to an embodiment of the present invention. FIGS. 4 and 5 are flowcharts illustrating a security method using a touch screen according to an embodiment of the present general inventive concept. FIG. 6 is a flowchart illustrating a method of recognizing and registering a fingerprint by an input tool in a security system according to an embodiment of the present general inventive concept. FIG. 7 is a flowchart illustrating a method of performing a corresponding security job by an operation driver and registering a password in a security system according to an embodiment of the present general inventive concept. FIG. 8 is a conceptual view illustrating a method of a secure function touch panel unit according to an embodiment of the present general inventive concept.

In the description, the apparatus may a portion of the security system, may be an office machine according to an embodiment of the present general inventive concept and may include multifunction apparatuses, printers, digital copiers, scanners, and the like having a touch screen. Hereinafter, the multifunction apparatus as a representative of the apparatus is exemplified.

Referring to FIGS. 2 and 3, the security system using a touch screen according to the embodiment of the present general inventive concept includes a multifunction apparatus 100, a fingerprint recognition input tool 200, and a host computer 300.

The multifunction apparatus applied to the embodiment of the present general inventive concept includes a secure function touch panel unit 110, a secure function touch panel processor 120, a normal function touch panel unit 160, a normal function touch panel processor 170, a warning unit 180, a fingerprint registration unit 140, a fingerprint database (DB), and a controller 150.

The secure function touch panel unit 110 receives only an input by the input tool 200, such as a pen, which is not an input by body contact, such as a finger contact, when a secure function is set to perform a security job, and the secure function touch panel processor 120 controls the secure function touch panel unit 110 and checks whether or not information input to the secure function touch panel unit 110 is input by the input tool 200.

The normal function touch panel unit 160 receives an input by an arbitrary tool including the user body or finger to perform a normal job which is not the security job, and the normal function touch panel processor 170 controls the normal function touch panel unit 160.

The secure function touch panel unit 110 and the normal function touch panel unit 160 may be formed in a single panel body having a first panel area to correspond to the secure function touch panel unit 110 and a second panel area to correspond to the normal function touch panel unit 160. It is possible that the secure function touch panel unit 110 and the normal function touch panel unit 160 are separated from each other on the multifunction apparatus 100.

The warning unit 180 generates a signal to warn when the secure function touch panel unit 110 receives an input by a finger. The signal may be an audio signal to be reproduced through a speaker or a video signal to be displayed on a screen of a display unit which can be connectable to the multifunction apparatus 100 or installed on a surface of the multifunction apparatus 100.

The fingerprint registration unit 140 registers a fingerprint of a user in advance in order to check whether or not a fingerprint recognized by a fingerprint contact unit 220 and a fingerprint recognition unit 210 of the input tool 200 is the registered fingerprint as the fingerprint of an authenticated user, and the fingerprint database (DB) 130 stores fingerprints registered by the fingerprint registration unit 140.

The controller 150 controls the secure function touch panel processor 120, the normal function touch panel processor 170, the fingerprint DB 130, the fingerprint registration unit 140, and the warning unit 180. Here, when a body portion of a user, such as a finger, instead of the input tool 200 contacts the secure function touch panel unit 110, the secure function touch panel processor 120 flows a specific current to the secure function touch panel unit 110 so that the body portion absorbs the current and the body contact is checked.

The fingerprint recognition input tool 200 is a tool to provide an input to the secure function touch panel processor 110 and includes the fingerprint recognition unit 210 to recognize a fingerprint of a user and the fingerprint contact unit 220 to make a contact with the user finger to receive the fingerprint of the user.

The input tool 200 may have a distal end which is made of a non-conductive material to make a contact with the secure function touch panel unit 110 to input data or command, and the user body may be conductive to absorb a current supplied to the secure function touch panel unit 110. The distal end of the input tool 200 may be formed of a material not to leave any remnant on the secure function touch panel unit 110 and/or the normal function touch panel unit 160, and the user body may leave any remnant on the secure function touch panel unit 110 or the normal function touch panel unit 160 after making a contact with the secure function touch panel unit 110 or the normal function touch panel unit 160. That is, the input tool 200 may be a remnant-free input tool 200.

The recognized fingerprint of the input tool 200 may be transmitted to the fingerprint registration unit 140 to register the fingerprint of the user as the fingerprint of the authenticated user, or to the controller 150 to compare the fingerprint of the input tool with the registered fingerprints stored in the fingerprint DB 130 to determine whether a user of the input tool is an authorized user to operate the security job through the secure function touch panel unit 110.

The multifunction apparatus 100 may further include a unit to perform an operation of the multifunction apparatus 100 using at least one component thereof. The unit may be an image forming unit 190 to feed a print medium, to form or print an image on the print medium, and to discharge the print medium. A conventional print unit may be used as the image forming unit 190. It is possible that the image forming unit 190 may be a scanner to scan a document to generate or form an image from the scanned document, or a transmitting unit to transmit the formed image or scanned image to an external device connected to the multifunction apparatus 100. However, the present general inventive concept is not limited thereto. The image forming unit 190 may be a component to perform an operation of the multifunction apparatus 100.

In the secure function, the controller 100 controls the image forming unit 190 to perform the operation according to a determination of whether the authorized user uses the input tool 200 according to the fingerprint recognized in the input tool 200, controls the secure function touch panel unit 110 according to the determination to receive an input command input from a contact of the input tool 200 and a desired portion of a panel surface of the secure function touch panel unit 110, and also controls the secure function touch panel processor 120 according to the determination to process the received input command from the secure function touch panel unit 110 to control the image forming unit 190 or other components to perform the operation corresponding to the security job.

In the normal function, the controller 150 controls the normal function touch panel unit 160 to receive an input command input from a contact of the input tool 200 and a desired portion of a panel surface of the normal function touch panel unit 160, and also controls the normal function touch panel processor 170 to process the received input command from the normal function touch panel unit 160 to control the image forming unit 190 or other components to perform the operation corresponding to a non-security job. A conventional touch panel unit can be used as the normal function touch panel unit 160. In this case, the secure function touch panel unit 110 can be added to or combined with the conventional touch panel unit.

According to the present embodiment, the user may input the input command as a password through the normal function touch panel unit 160 and another input command to operate the image forming unit 190. Also, in the secure function, the user may be required to input a password using the contact the input tool 200 and the secure function touch panel unit 110 in addition to the fingerprint input to the input tool 200 to input another command to operate the image forming unit 190.

As illustrated in FIG. 3, when a user selects a secure function setting 115, the user is required to make a contact between a user finger and the input tool 200 to generate a fingerprint to enable an operation of the secure function. The user may be required to enter a password using the input tool 200 using a displayed touch pad including numbers of 0 through 9 and characters of * and #. The user may select one of operations, such as a print operation, a fax operation, a copy operation, and a scan operation and may also select one of operations of normal functions I, II, III, and IV, using a contact between the panel and the user finger or the input tool 200.

The host computer 300 includes a driver 310 to enable the multifunction apparatus 100 to perform a corresponding job (for example, printing), and the driver 310 includes a security job registration unit 312 and a job performing unit 314 to register a security job and to perform the security job.

One of the secure function (secure function mode) and the normal function (normal function mode) can be set by the controller 190 of the multifunction apparatus 100 or the driver 310 of the host computer 300. According to the set one of the secure function and the normal function, the controller 150 may selectively control one or both a first group of secure function touch panel unit 110 and the secure function touch panel processor 120, and a second group of the normal function touch panel unit 160 and the normal function touch panel processor 170.

Referring to FIGS. 2 and 4, the security method using a touch screen in a security system according to an embodiment of the present general inventive concept includes checking whether or not a security job is selected (operation S100), operating the secure function touch panel unit 110 for the security job when the security job is selected (operation 200), checking whether or not a password for the security job is input by the input tool 200 which is not a body portion such as a finger (operation S300), checking whether or not the password input in operation S300 is the same as a password set when the security job is performed by the host computer 300 (operation S400), and performing a corresponding security job when the password input in operation S300 is the same as the password set when the security job is performed by the host computer 300 (operation S500). In addition, the security method further includes generating a warning signal representing an error when a password for the security job is input by a finger in operation S300 or when the password input by the input tool 200 is not the same as the password set when the security job is performed by the host computer 300 in operation S400 (operation S600), and performing a normal job in a conventional manner when the security job is not selected in operation S100 (operation S700).

In operation S300, the password is input when logging in the security job or logging out from the security job, or when the security job is performed. According to the embodiment of the present general inventive concept, the password is input during not only the security job but also the normal job such as the logging in or logging out. In operation S600, instead of warning, operations of logging in, logging out, and the security job are set so as not to be performed.

Referring to FIG. 5, a security method using a touch screen in a security system according to another embodiment of the present general inventive concept further includes operation S450 of checking whether or not fingerprint data recognized by the input tool 200 matches fingerprint data registered by the fingerprint database 130 after operation S400 illustrated in FIG. 4 to perform the security function.

Hereinafter, operations of the security method and system using a touch screen according to the embodiment of the present general inventive concept will be described with reference to FIGS. 2 to 7.

FIG. 7 illustrates a method of performing an operation of a security job by using a corresponding driver (printer driver) of the host computer 300 (operation S910), and registering a password corresponding to the operation (operation S920). The detailed operations of the method illustrated in FIG. 7 are well known, so that a detailed description thereof is omitted.

In the method illustrated in FIG. 6, a fingerprint of a user is recognized by the fingerprint recognition unit 210 of the input tool 200 (operation S810), and the recognized fingerprint may be registered in the fingerprint DB 130 through the fingerprint registration unit 140 (operation S820). It is possible that, without using the input tool 200, a fingerprint is directly input to and recognized by the fingerprint registration unit 140, and the recognized fingerprint may be registered in the fingerprint DB 130. In this case, the fingerprint registration unit 140 and the secure function touch panel unit 110 can recognize fingerprint data transmitted from the input tool 200.

Hereinafter, by using an example in which secure printing is performed as the security job, the operations according to the embodiment of the present general inventive concept will be described.

When the user presses a secure function setting button 115 provided to the secure function touch panel unit 110 illustrated in FIG. 3, the controller 150 determines that the user wants the secure printing and controls the secure function touch panel processor 120 to flow a current, such as a micro current usable to operate a touch panel as an input unit, through the secure function touch panel unit 110 to receive an input therefrom (operations S100 and S200).

As illustrated in FIG. 8, when a body portion such as a finger contacts the secure function touch panel unit 110 in a state where the current flows through the secure function touch panel unit 110, the current is absorbed by the body portion and accordingly the current is not output to the secure function touch panel processor 120. Therefore, the secure function touch panel processor 120 knows that the finger contacts the secure function touch panel unit 110.

When the user presses the secure function setting button 115 illustrated in FIG. 3 and inputs a password corresponding to the secure printing with the finger to the secure function touch panel unit 110, the controller 150 operates the warning unit 180 with reference to a signal output from the secure function touch panel processor 120 (operations S300 and S600) or sets the operations of logging in, logging out, or the security job so as not to be performed.

When the user presses the secure function setting button 115 illustrated in FIG. 3 and inputs the password corresponding to the secure printing by using the input tool 200 which does not absorbs the current flowing through the secure function touch panel unit 110, the controller 150 does not generate a signal representing an error or a warn message and determines whether or not the password input through the input tool 200 is the same as the password corresponding to the secure printing. When the passwords are the same, the secure printing is performed, and otherwise, the controller 150 controls the warning unit 180 to warn (operation S400 and S500).

When the user does not want the secure printing and selects a normal function button provided to the normal function touch panel unit 160 of the multifunction apparatus 100, the controller 150 controls the normal function touch panel processor 170 so that a corresponding function of the multifunction apparatus 100 is performed in a conventional manner (operation S700).

According to another embodiment of the present general inventive concept, a fingerprint of a user using the input tool 200 is recognized by the fingerprint contact unit 220 and the fingerprint recognition unit 210 and input to the controller 150 via the secure function touch panel unit 110, the controller 150 checks whether or not input fingerprint is registered in the fingerprint DB 130. When the input fingerprint is registered in the fingerprint DB 130, the controller 150 determines that the user has authority of the secure printing and performs the secure printing. Otherwise, although the passwords are the same in operation S400, the controller 150 determines that the user does not have the authority of the secure printing, and the controller 150 controls the warning unit 180 to warn (operations S450 and S500). Therefore, according to the current embodiment of the present general inventive concept, the improved security job can be performed.

Accordingly, in the security method and system using a touch screen of an office machine such as a multifunction apparatus according to the embodiments of the present general inventive concept, when a secure function such as secure printing is set instead of a normal function while the touch screen is manipulated, only manipulation input using an input tool but not finger manipulation is allowed. Therefore, leakage of security information due to fingerprint marks and smudges caused by finger manipulation can be prevented.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been particularly shown and described with reference to exemplary embodiments thereof, it will be understood by those skilled in the art that various changes in form and details may be made therein without departing from the spirit and scope of the present general inventive concept as defined by the appended claims.

What is claimed is:

1. A security method using a touch screen of an apparatus in a security system, the method comprising:
checking whether or not a password is input; and
inputting to the touch screen the password using an input tool which is not part of a user's body, in order to perform a security job, wherein, when the input tool used to input the password to the touch screen is part of the user's body, the input of the password is ignored, and when the input tool used to input the password to the touch screen is not part of the user's body, it is determined whether the input password coincides with a preset password.

2. The security method of claim 1, wherein the password is input when logging in and logging out.

3. The security method of claim 1, further comprising:
generating a warning signal when a finger is used as the user's body to input the password to the touch screen.

4. The security method of claim 1, wherein, when a finger is used as the user's body to input the password to the touch screen, an operation of logging in or logging out from a security function is not performed.

5. The security method of claim 1, wherein, when a finger is used as the user's body to input the password to the touch screen, performance of the security job is blocked.

6. The security method of claim 1, wherein the input tool comprises a fingerprint recognition unit to input a fingerprint of a user.

7. The security method of claim 1, further comprising:
comparing the password input in inputting with a password stored in the apparatus; and
performing a security job when the input password is the same as the password stored in the office machine.

8. A security system using a touch screen of an apparatus, comprising:
a secure function touch panel unit to receive only an input by an input tool other than body contact when a secure function is set to perform a security job; and
a secure function touch panel processor to control the secure function touch panel unit, and to check whether or not information input to the secure function touch panel unit is input by the input tool,
wherein, when a password is input to the secure function touch panel unit by using a user's body, the secure function touch panel processor ignores the input of the password, and when the password is input to the secure function touch panel by using the input tool which is not part of the user's body, the secure function touch panel processor determines whether the input password coincides with a preset password.

9. The security system of claim 8, wherein the input by the input tool is performed when logging in or logging out from the security function.

10. The security system of claim 8, further comprising:
a normal function touch panel unit to receive an input by a body portion including a finger to perform a normal job other than the security job; and
a normal function touch panel processor to control the normal function touch panel unit.

11. The security system of claim 10, wherein the secure function touch panel unit and the normal function touch panel unit are displayed on a same screen.

12. The security system of claim 8, further comprising:
a warning unit to generate a warn signal when the secure function touch panel unit receives an input by an object which is not the input tool.

13. The security system of claim 8, wherein, when the secure function touch panel unit receives an input by an object which is not the input tool, logging in or logging out is not performed.

14. The security system of claim 8, wherein, when the secure function touch panel unit receives an input by an object which is not the input tool, performing the security job is blocked.

15. The security system of claim 8, wherein the input tool which provides an input to the secure function touch panel processor includes a fingerprint recognition unit to input a fingerprint of a user.

16. The security system of claim 8, further comprising:
a fingerprint registration unit to register a fingerprint of a user in advance in order to check whether or not the fingerprint input by the fingerprint recognition unit of the input tool is a fingerprint of an authenticated user;
a fingerprint database to store the fingerprint registered by the fingerprint registration unit; and
a controller to compare the fingerprint input by the input tool in order to perform the security job, with the fingerprint registered in the fingerprint database, and to determine whether or not the input fingerprint is the fingerprint of the authorized user.

17. The security system of claim 8, wherein the secure function touch panel processor flows a predetermined current to the secure function touch panel unit such that when an object which is not the input tool contacts the secure function touch panel unit, the object absorbs the current, thereby indicating that the information input to the secure function touch panel unit has not been input by the input tool.

18. A touch screen of an apparatus, comprising:
   a secure function touch panel unit to receive only an input by an input tool which is not part of a user's body when a secure function such as a security job is performed; and
   a secure function touch panel processor to control the secure function touch panel unit and to check whether or not information input to the secure function touch panel unit is input by the input tool,
   wherein, when a password is input to the secure function touch panel unit by using a user's body, the secure function touch panel processor ignores the input of the password, and when the password is input to the secure function touch panel by using the input tool which is not part of the user's body, the secure function touch panel processor determines whether the input password coincides with a preset password.

19. The touch screen of claim 18, further comprising a normal function touch panel unit, wherein the secure function touch panel unit and the normal function touch panel unit are formed in one panel.

20. The touch screen of claim 18, further comprising a normal function touch panel unit, wherein the secure function touch panel unit and the normal function touch panel unit are independently formed in different panels.

21. The touch screen of claim 18, further comprising:
   a normal touch panel to receive an input by a body portion or an input by the input tool in order to perform a normal job which is not the security job.

22. The touch screen of claim 21, wherein the secure function touch panel unit and the normal function touch panel unit are formed in one panel.

23. The touch screen of claim 21, wherein the secure function touch panel unit and the normal function touch panel unit are independently formed in different panels.

24. The touch screen of claim 21, further comprising:
   a normal function touch panel processor to independently control the normal function touch panel unit.

25. The security method of claim 6, further comprising:
   comparing the fingerprint of the user with previously stored fingerprints; and
   verifying that the user is authorized to perform the security job based on the comparison of the fingerprint of the user with the previously stored fingerprints.

26. The security method of claim 25, further comprising:
   comparing the password that has been input with previously stored passwords, wherein the security job is performed when (i) the password that has been input matches one of the previously stored passwords, and (ii) the user is verified as an authorized user by the comparison of the fingerprint of the user with the previously stored fingerprints.

27. The security method of claim 1, further comprising:
   flowing a predetermined current through the touch panel; and
   checking whether the input tool used to input the password to the touch screen has absorbed the predetermined current, wherein the input tool used to input the password to the touch screen is determined to be part of the user's body when the predetermined current has been absorbed by the input tool.

28. The touch screen of claim 18, wherein the secure function touch panel processor flows a predetermined current to the secure function touch panel unit such that when an object which is not the input tool contacts the secure function touch panel unit, the object absorbs the current, thereby indicating that the information input to the secure function touch panel unit has not been input by the input tool.

* * * * *